(12) United States Patent
Jin et al.

(10) Patent No.: US 11,964,546 B2
(45) Date of Patent: Apr. 23, 2024

(54) END COVER MEMBER FOR OUTBELT OF DOOR FOR VEHICLE AND FASTENING STRUCTURE FOR OUTBELT AND GLASS RUN OF DOOR USING THE SAME

(71) Applicants: Hyundai Motor Company, Seoul (KR); Kia Corporation, Seoul (KR)

(72) Inventors: Seong-Geun Jin, Hwaseong-si (KR); Young-Min An, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 228 days.

(21) Appl. No.: 17/533,232

(22) Filed: Nov. 23, 2021

(65) Prior Publication Data

US 2022/0332177 A1    Oct. 20, 2022

(30) Foreign Application Priority Data

Apr. 14, 2021   (KR) ........................ 10-2021-0048363

(51) Int. Cl.
*B60J 10/76* (2016.01)
*B60J 5/04* (2006.01)
*B60J 10/27* (2016.01)
*B60J 1/17* (2006.01)
*B60J 10/16* (2016.01)

(52) U.S. Cl.
CPC ............ *B60J 10/76* (2016.02); *B60J 5/0402* (2013.01); *B60J 5/0411* (2013.01); *B60J 10/27* (2016.02); *B60J 1/17* (2013.01); *B60J 10/16* (2016.02)

(58) Field of Classification Search
CPC . B60J 5/0411; B60J 10/75; B60J 10/76; B60J 5/0426; B60J 5/0402; B60J 10/2335; B60R 13/04
See application file for complete search history.

(56) References Cited

U.S. PATENT DOCUMENTS

| | | | | |
|---|---|---|---|---|
| 4,442,634 A | * | 4/1984 | Kimura .................... | B60J 10/17 49/377 |
| 5,740,640 A | * | 4/1998 | Yasuda ................... | B60J 10/265 52/204.597 |
| 7,458,185 B2 | * | 12/2008 | Imaizumi ................. | B60J 10/75 49/440 |
| 8,758,872 B2 | * | 6/2014 | Mutoh ..................... | B60J 10/75 428/57 |
| 9,038,318 B2 | * | 5/2015 | Jendrossek .......... | B60J 10/2335 49/492.1 |
| 10,583,716 B2 | * | 3/2020 | Bito ........................ | B60J 5/0402 |
| 10,889,171 B2 | * | 1/2021 | Thiele ...................... | B60J 10/32 |

(Continued)

FOREIGN PATENT DOCUMENTS

KR   20170140483 A   12/2017

*Primary Examiner* — Jason S Morrow
(74) *Attorney, Agent, or Firm* — SLATER MATSIL, LLP

(57) ABSTRACT

An embodiment end cover member for an outbelt of a vehicle door includes a cover part configured to cover a portion where an end of the outbelt and an end of a glass run abut each other, an upper body positioned on an upper end of a panel mounted with a window glass, a lower body positioned below the upper body, the lower body including a locking hook locked and fixed to the panel, wherein the upper body and the locking hook vertically grip the panel to be fixed to the panel, and a connection part connecting the upper body to the lower body.

19 Claims, 12 Drawing Sheets

(56) References Cited

U.S. PATENT DOCUMENTS

| | | | | |
|---|---|---|---|---|
| 11,186,153 B2 * | 11/2021 | Hasnaoui | ................. | B60J 10/33 |
| D966,882 S * | 10/2022 | Weng | .............................. | D8/395 |
| D972,928 S * | 12/2022 | Weng | .............................. | D8/402 |
| 11,607,931 B2 * | 3/2023 | Prekop | ................... | B60J 5/0476 |
| 11,697,333 B2 * | 7/2023 | Cho | ........................ | B29C 48/12 |
| | | | | 296/39.1 |

* cited by examiner

END COVER MEMBER FOR OUTBELT OF DOOR FOR VEHICLE AND FASTENING STRUCTURE FOR OUTBELT AND GLASS RUN OF DOOR USING THE SAME

CROSS-REFERENCE TO RELATED APPLICATIONS

This application claims the benefit of Korean Patent Application No. 10-2021-0048363, filed on Apr. 14, 2021, which application is hereby incorporated herein by reference.

TECHNICAL FIELD

The present disclosure relates to an end cover member for an outbelt of a door for a vehicle and a fastening structure of an outbelt and a glass run of a door using same.

BACKGROUND

A door of a vehicle is provided with a glass run fitted between a door frame and a window glass to support and protect the circumference of the window glass.

Further, a portion where the window glass is installed in the door is provided with an outbelt for preventing foreign matters, such as dust or moisture, from being introduced into the door when the window glass moves upward or downward.

As illustrated in FIG. 1, when the door is assembled, the end of an outbelt 113 is fastened to a glass run 112. At this time, the glass run 112 and the outbelt 113 should be finished to have a continuous shape. When the glass run 112 and the outbelt 113 are integrally produced, the glass run 112 and the outbelt 113 may have a continuous shape, which causes an increase in the cost. Particularly, a small vehicle or a compact vehicle sensitive to the cost mainly uses a method for separately producing and assembling the glass run 112 and the outbelt 113, and then covering the assembly with an end cover member 120.

However, it is difficult to apply a separate clip to the outbelt 113 using a mixed material of polypropylene (PP) and thermoplastic vulcanizate (TPV) in consideration of the cost and the weight, the basic section of the outbelt 113 has an insufficient fastening force compared to that of a general metal core type outbelt, and it is difficult to apply a separate fastening structure to a center pillar side, such that there is the possibility of separating a component.

Meanwhile, a door panel 111 and the outbelt may be integrally formed, which causes a poor appearance and an increase in cost.

There is a method for forming a cover shape on the end of the outbelt using an insert injection, which causes a problem in that the appearance of an injection part is exposed.

There is also a method for integrally forming an endpiece inside the end of the outbelt and fastening the end of the outbelt and the end of the glass run in a bar structure. However, this method has a problem in that the quality of appearance deteriorates due to a gap or a step that occurs in a portion where the outbelt and the glass run abut each other.

The contents described in this section are to help the understanding of the background of the present disclosure, and may include what is not previously known to those skilled in the art to which the present disclosure pertains.

SUMMARY

The present disclosure relates to an end cover member for an outbelt of a door for a vehicle and a fastening structure of an outbelt and a glass run of a door using same. Particular embodiments relate to an end cover member for an outbelt of a door for a vehicle and a fastening structure of an outbelt and a glass run of a door using same, which prevent a separation after fastening while covering a portion where an outbelt and a glass run are connected in a door for a vehicle.

Embodiments of the present disclosure can solve problems in the art, and an embodiment of the present disclosure provides an end cover member for an outbelt of a door for a vehicle and a fastening structure of an outbelt and a glass run of a door using same, in which a fastening force is improved to prevent separation while covering a portion where a glass run and an outbelt are connected, thereby improving the qualities of appearance and assembly.

An embodiment of the present disclosure provides an end cover member for an outbelt of a door for a vehicle, the end cover member including a cover part configured to cover a portion where an end of an outbelt and an end of a glass run abut each other, an upper body positioned on an upper end of a panel mounted with a window glass, a lower body positioned below the upper body, and formed with a locking hook locked and fixed to the panel, and a connection part configured to connect the upper body to the lower body, and connected to a bottom surface of the cover part, in which the upper body and the locking hook vertically grip the panel to be fixed to the panel.

An extension having an upper end connected to the lower body may be formed, and the locking hook may be formed from a lower end of the extension in a width direction of a vehicle, such that an upper surface of the locking hook is locked to the panel.

The locking hook may be locked to a locking part formed to extend downward from a through hole of the panel and be fixed to the panel.

The locking hook may have an upper surface formed to be tilted upward.

The upper body may be formed with a seating surface positioned on the upper end of the panel and configured to limit the downward movement of the end cover member, and a support surface abutting an outer surface of the panel, and the seating surface may be formed in the width direction of the vehicle, and the support surface may be formed in a height direction of the vehicle.

The connection part may be formed with a stopper locked to a stop surface formed on the panel and configured to limit the movement of the end cover member in a longitudinal direction of the vehicle.

A fixing projection protruding from the connection part or the lower body and configured to grip the outbelt may be formed.

The fixing projection may be formed in the longitudinal direction of the vehicle at an interval from the connection part or the lower body, and the outbelt may be inserted between the connection part or the lower body and the fixing projection to limit the movement of the end cover member in the width direction of the vehicle.

The fixing projection formed on the lower body and the fixing projection formed on the connection part may be formed in the same direction.

The fixing projection formed on the lower body and the fixing projection formed on the connection part may be formed to be directed toward the front of the vehicle.

The upper body and the lower body may be positioned outside and inside the panel, respectively.

The cover part, the upper body, the lower body, and the connection part may each be made of a mixed material of polypropylene (PP) and thermoplastic vulcanizate (TPV) and be integrally formed.

Embodiments of the present disclosure provide a fastening structure of an outbelt and a glass run of a door using an end cover member for an outbelt of a door for a vehicle. The fastening structure includes an end cover member fitted into and fixed to a panel installed with a window glass, an outbelt provided on the panel in a longitudinal direction of a vehicle and configured to guide the upward or downward movement of the window glass, and a glass run configured to support the circumference of the window glass, in which an end of the outbelt and an end of the glass run are covered and fixed by the end cover member.

The end of the outbelt may cover an upper body of the end cover member on one side of a connection part of the end cover member and be fitted and fixed between a lower body of the end cover member and the panel, the end of the glass run may be positioned on the other side of the connection part, and a cover part of the end cover member may cover the end of the outbelt and the end of the glass run.

The end cover member may be fastened to the panel at a predetermined distance from a center pillar of the vehicle.

The end cover member for an outbelt of a door for a vehicle and the fastening structure of an outbelt and a glass run of a door using the same according to embodiments of the present disclosure having the above configuration may resolve the problem in that the end cover member is separated because the separation of the end cover member in all directions is prevented when the end cover member is fastened between the glass run and the outbelt.

Further, since the end cover member may be prevented from being separated, the qualities of appearance and assembly do not deteriorate even if the mixed material of PP and TPV advantageous in terms of the cost and the weight is applied to the outbelt.

DETAILED DESCRIPTION OF ILLUSTRATIVE EMBODIMENTS

Figure 1:
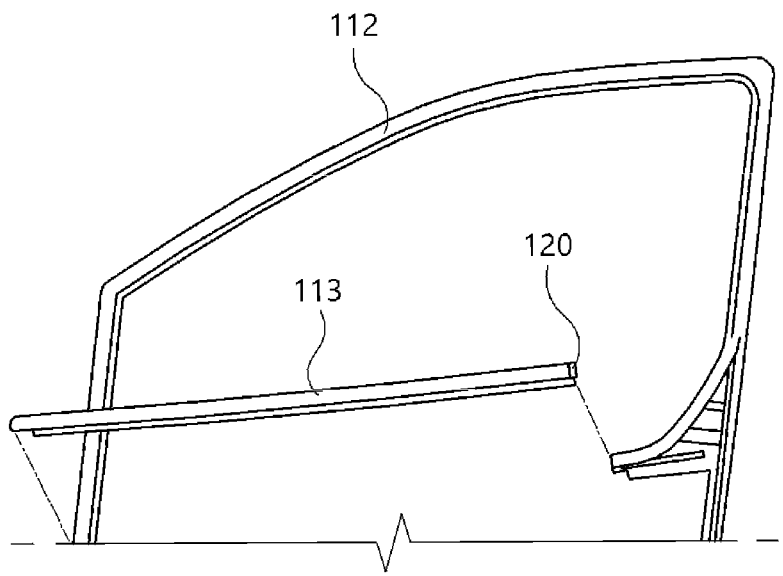
FIG. 1 is a schematic diagram of a door to which a fastening structure of an outbelt and a glass run of the door according to the related art is applied.
Figure 2:
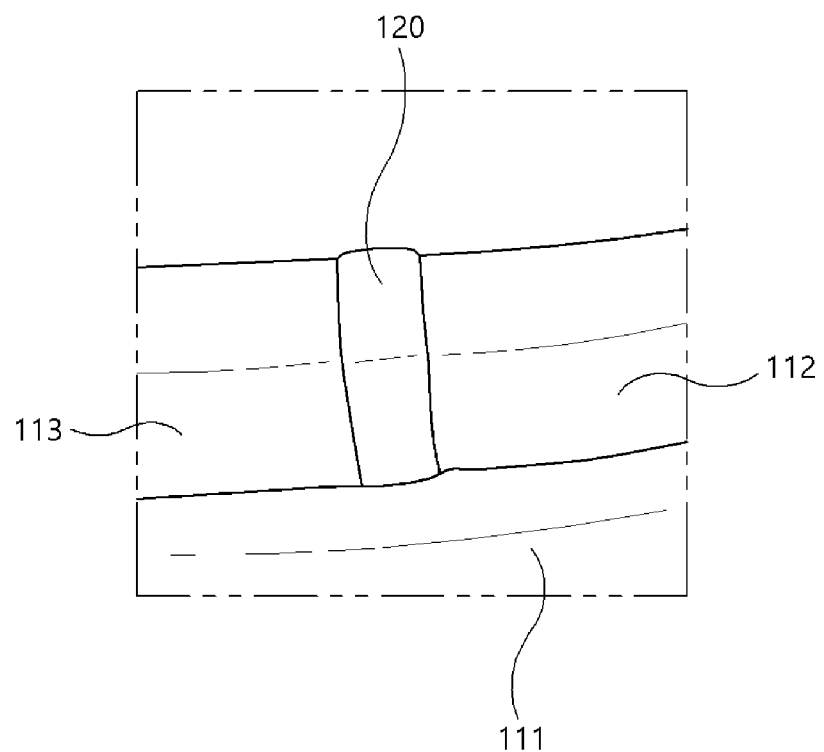
FIG. 2 is a perspective diagram illustrating a state where the outbelt and the glass run are fastened by using an end cover member for an outbelt of a door for a vehicle according to the related art.
Figure 3:
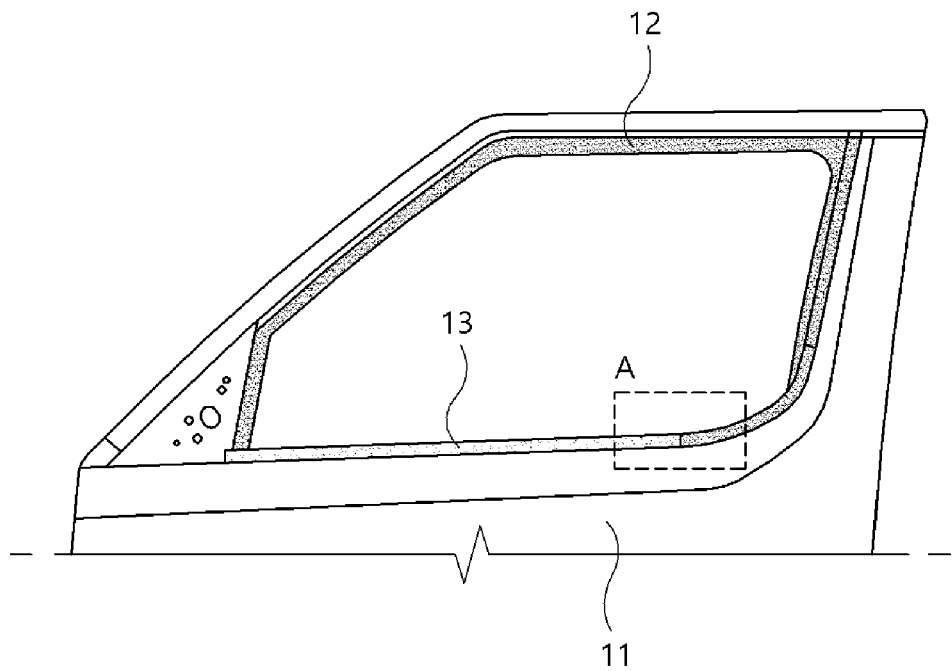
FIG. 3 is a schematic diagram of a door to which an end cover member for an outbelt of a door for a vehicle and a fastening structure of an outbelt and a glass run of a door using the same according to embodiments of the present disclosure are applied.
Figure 4:
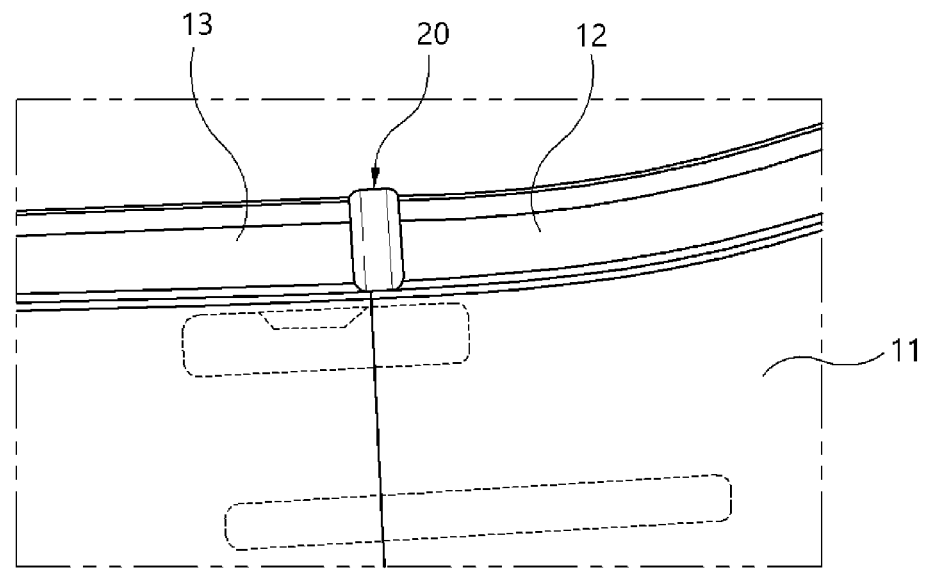
FIG. 4 is an enlarged diagram of portion A illustrated in FIG. 3.
Figure 5:
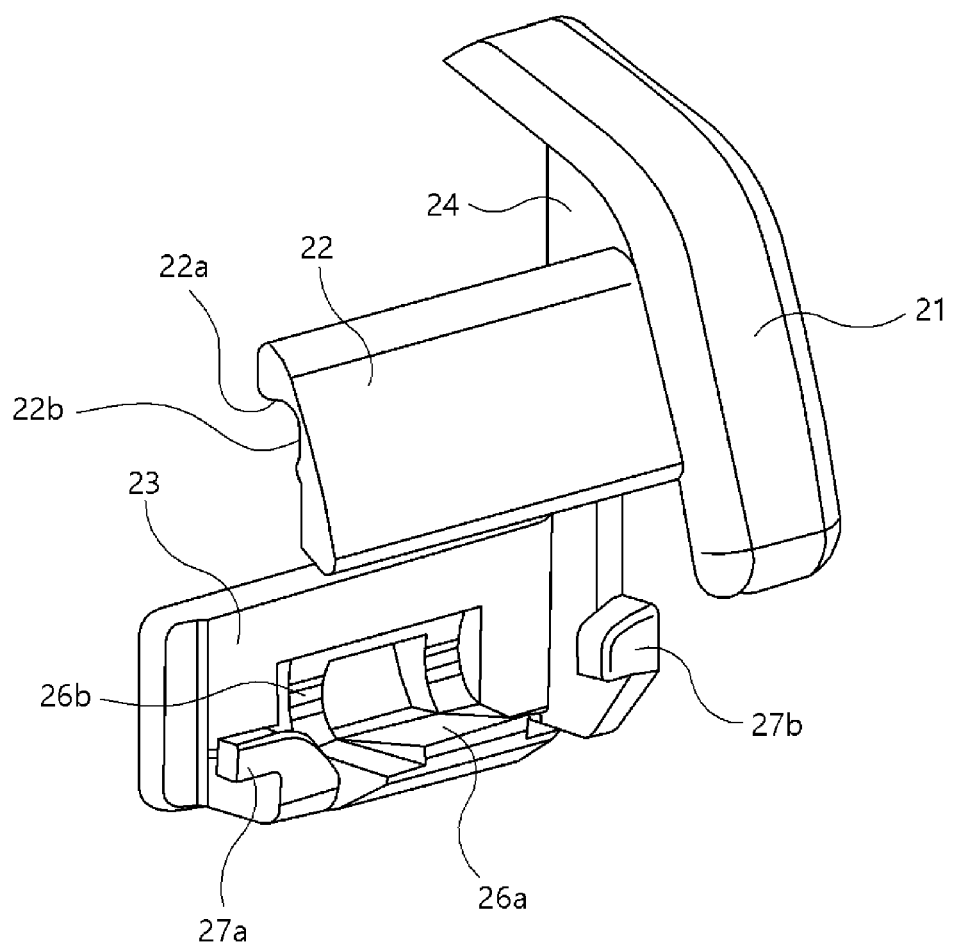
FIG. 5 is a perspective diagram illustrating the end cover member for an outbelt of a door for a vehicle according to embodiments of the present disclosure.
Figure 6:
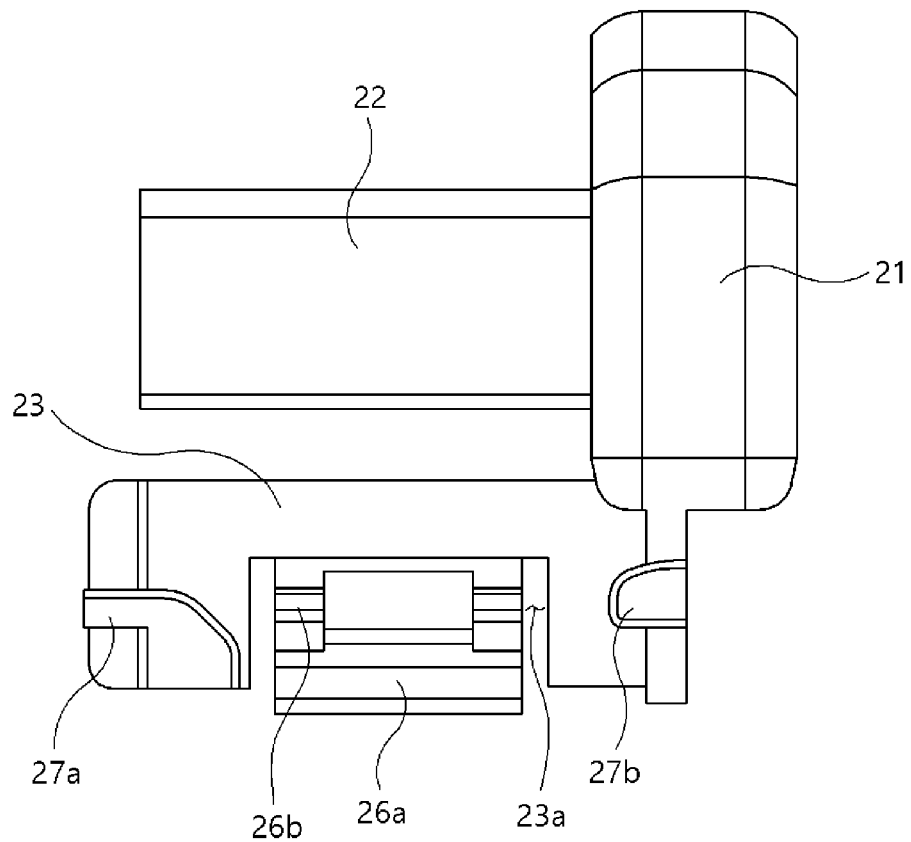
FIG. 6 is a front diagram illustrating the end cover member for an outbelt of a door for a vehicle according to embodiments of the present disclosure.
Figure 7:
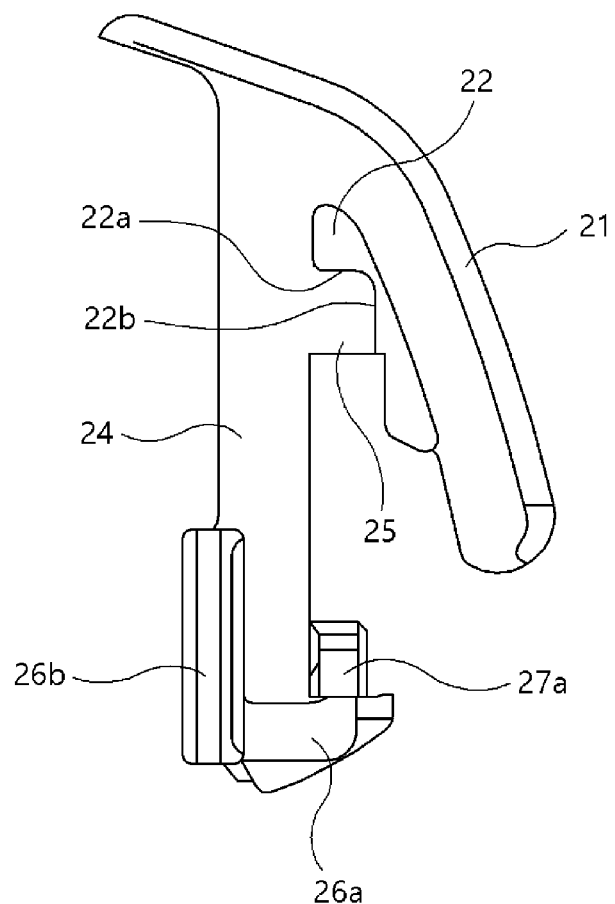
FIG. 7 is a side diagram illustrating the end cover member for an outbelt of a door for a vehicle according to embodiments of the present disclosure.
Figure 8:
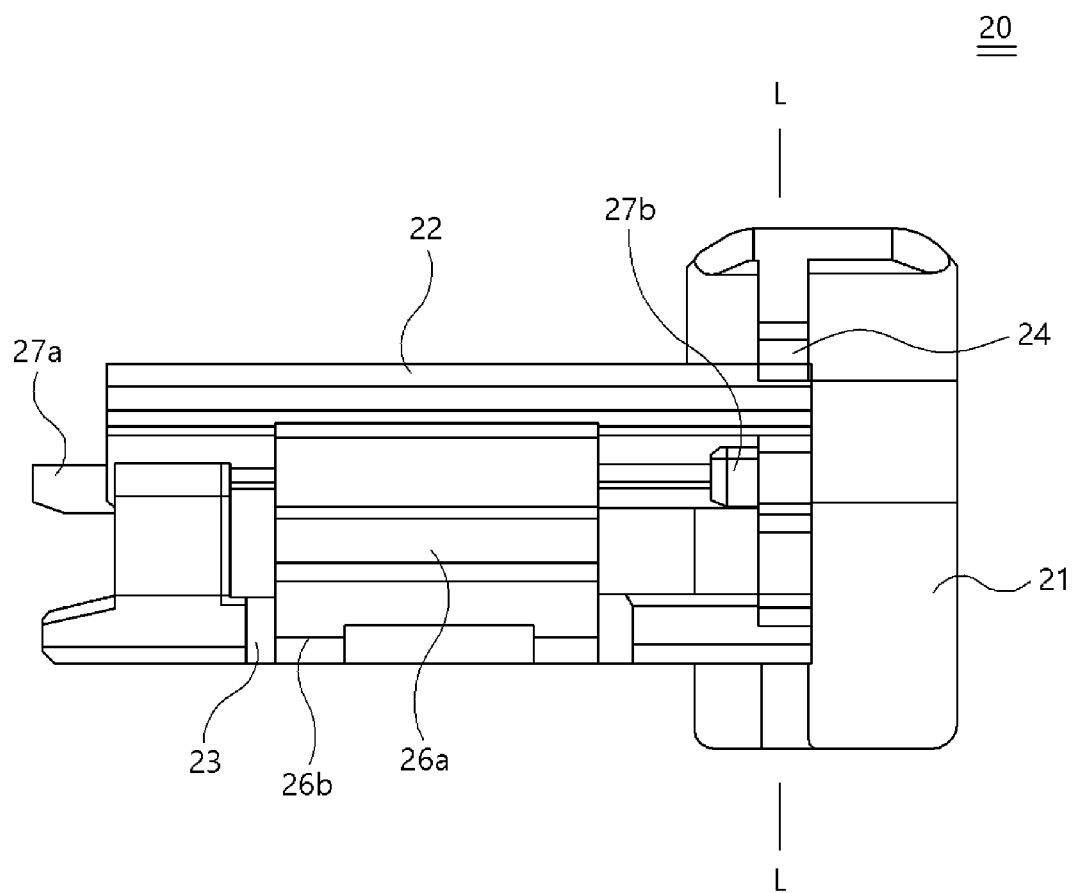
FIG. 8 is a bottom diagram illustrating the end cover member for an outbelt of a door for a vehicle according to embodiments of the present disclosure.
Figure 9:
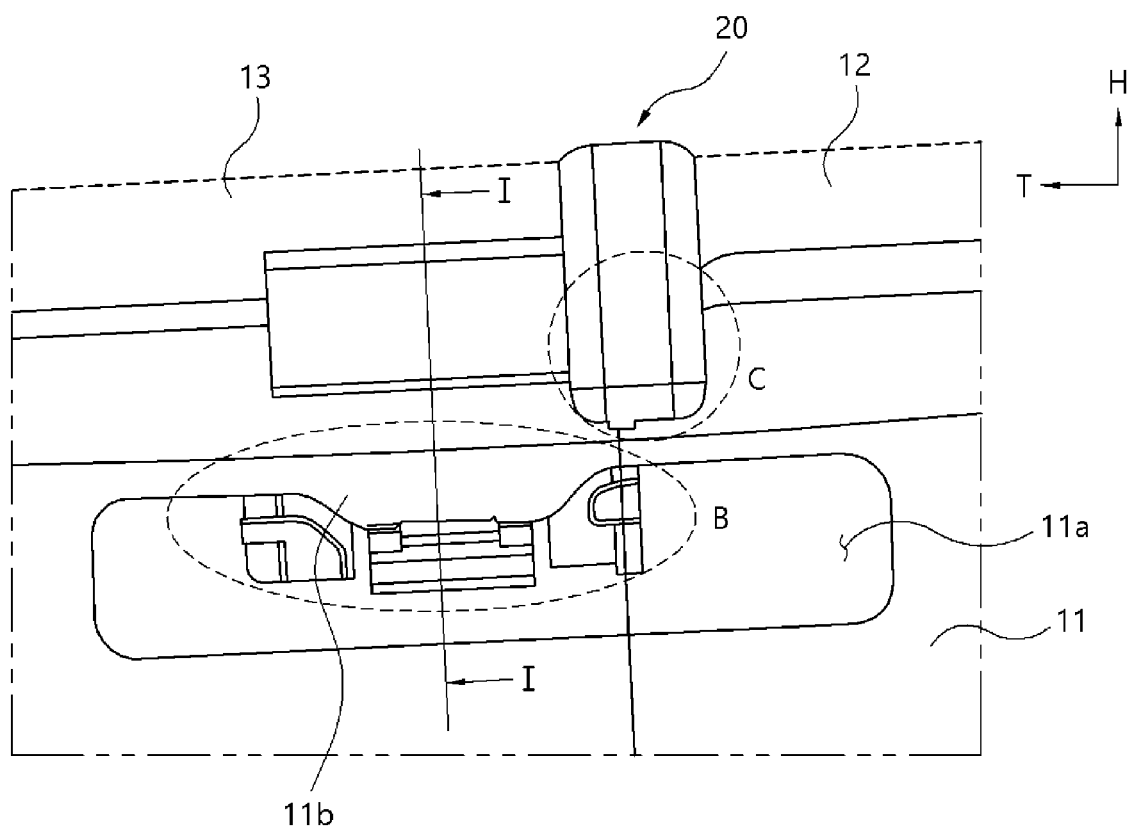
FIG. 9 is a schematic diagram illustrating a state where the end cover member for an outbelt of a door for a vehicle according to embodiments of the present disclosure is fastened to a door panel.
Figure 10:
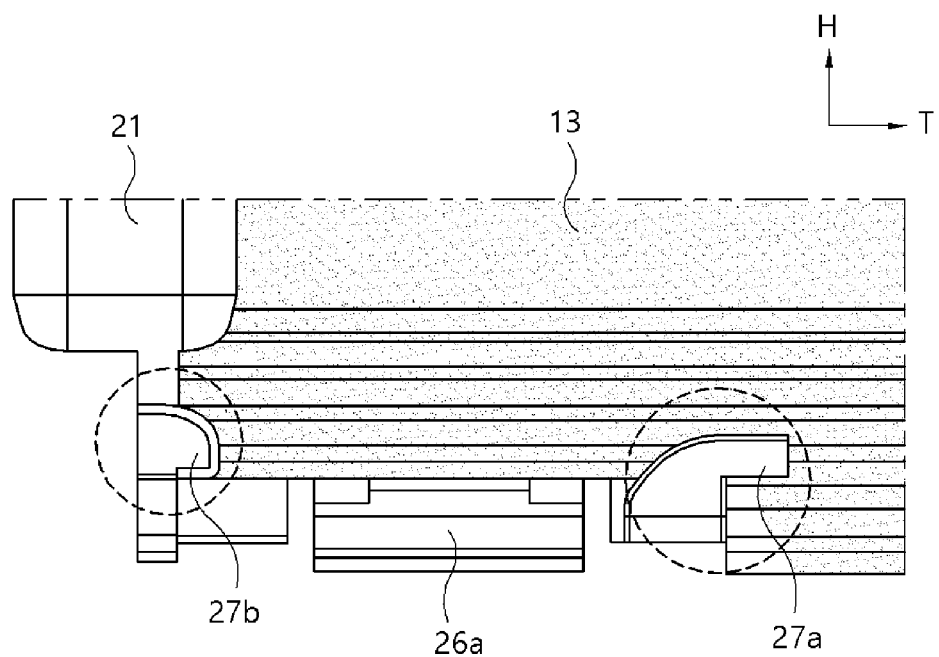
FIG. 10 is a cross-sectional diagram taken along line I-I in FIG. 9 and illustrating a state where the end cover member is fastened to the door panel.
Figure 11:
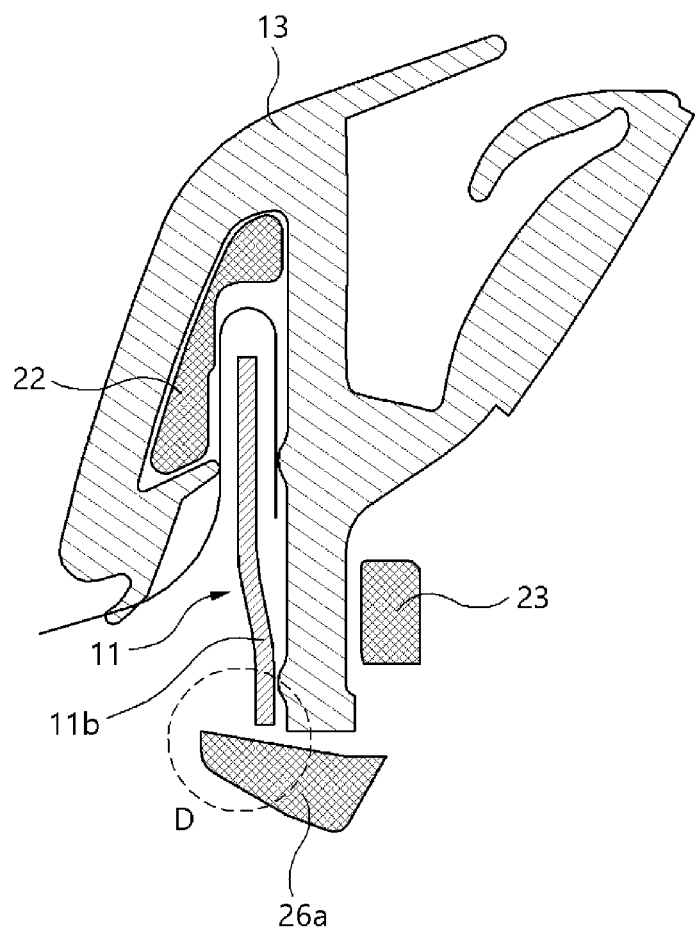
FIG. 11 is a cross-sectional diagram taken along line I-I in FIG. 9 and illustrating a basic cross section before the end cover member is fastened to the door panel.
Figure 12:
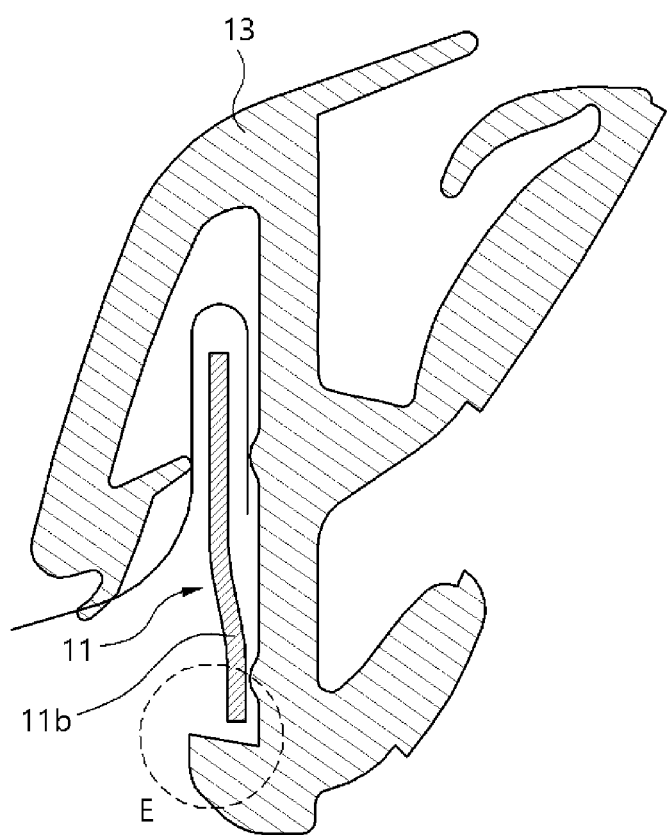
FIG. 12 is an enlarged diagram of portion B in FIG. 9.

Hereinafter, an end cover member for an outbelt of a door for a vehicle and a fastening structure of an outbelt and a glass run of a door using the same according to embodiments of the present disclosure will be described in detail with reference to the accompanying drawings.

As illustrated in FIGS. 3-13, an end cover member 20 according to embodiments of the present disclosure is fitted into a panel 11 installed with a window glass in a vehicle and covers a portion where an outbelt 13 and a glass run 12 are connected. The panel 11 may be a door panel 11 installed with the window glass to be movable upward/downward.

Hereinafter, an example in which the end cover member 20 is applied to the door panel 11 will be described.

The end cover member 20 according to embodiments of the present disclosure includes a cover part 21 configured to cover a portion where an end of the outbelt 13 and an end of the glass run 12 abut each other, an upper body 22 positioned on an upper end of the door panel 11 mounted with a window glass, a lower body 23 positioned below the upper body 22 and formed with a locking hook 26a locked and fixed to the door panel 11, and a connection part 24 configured to connect the upper body 22 to the lower body 23, and connected to a bottom surface of the cover part 21, in which the upper body 22 and the locking hook 26a vertically grip the door panel 11 to be fixed to the door panel 11.

The cover part 21 covers the portion where the end of the outbelt 13 and the end of the glass run 12 abut each other. The cover part 21 has a front surface exposed to the outside and a rear surface abutting a surface of the end of the glass run 12 or the end of the outbelt 13.

The cover part 21 has a form following a line connected from the outbelt 13 or the glass run 12 to the door panel 11. In other words, the cover part 21 has an upper portion with a gentle slope and a lower portion with a steep slope based on a center portion thereof.

The upper body 22 is positioned on the upper end of the door panel 11. The upper body 22 is positioned on the upper end of the door panel 11 to limit the downward movement of the end cover member 20.

The upper body 22 is formed with a seating surface 22a placed on the upper end of the door panel 11, and a support surface 22b allowing the upper body 22 to abut the door panel 11. The seating surface 22a is placed on the upper end of the door panel 11 to abut the upper end of the door panel 11. The support surface 22b abuts an outer upper end of the door panel 11 to support the end cover member 20. The seating surface 22a is formed in a width direction of the vehicle, and the support surface 22b is formed in a height direction of the vehicle, such that the seating surface 22a and the support surface 22b are formed to be perpendicular to each other to limit the downward movement of the end cover member 20.

Further, the upper body 22 fills a space formed between an upper portion of the door panel 11 and an inner surface of the outbelt 13 to reduce a vertical clearance of the end cover member 20. If the outbelt 13 is directly installed on the door panel 11 (see FIG. 12), the space is formed between the upper portion of the door panel 11 and the inner surface of the outbelt 13, but the upper body 22 fills the space (see FIG. 11) to reduce the clearance.

Here, the upper end of the door panel 11 does not mean the uppermost end of the door, but means a portion where the window glass begins to be exposed when the window glass moves upward after being fully stored.

The lower body 23 is positioned below the upper body 22.

A lower end of the lower body 23 is formed with the locking hook 26a by which the end cover member 20 grips the door panel 11.

The door panel 11 is formed with a through hole 11a for coupling the end cover member 20, and the locking hook 26a is fixed to the circumference of the through hole 11a to limit the upward movement of the end cover member 20. A part of the circumference of the through hole 11a extends downward toward the center of the through hole 11a to form a locking part 11b, and the locking hook 26a is locked to the locking part 11b to fix the end cover member 20. The downward movement of the end cover member 20 is limited by the seating surface 22a formed on the upper body 22, and the upward movement thereof is limited by the locking hook 26a formed on the lower body 23, such that the end cover member 20 is fastened to the door panel 11. Such a structure limits the movement of the end cover member 20 in an H direction of the vehicle, that is, a vertical direction of the vehicle in the door panel 11. In other words, referring to FIG. 11, the door panel 11 is gripped by and fixed to the seating surface 22a of the upper body 22 and the locking hook 26a, which makes it possible to limit the movement of the end cover member 20 in the H direction.

In order for the locking hook 26a to be formed on the lower body 23, an extension 26b having an upper end connected to the lower body 23 is formed, and the locking hook 26a is formed by extending from an end of the extension 26b in the width direction of the vehicle.

The extension 26b has the upper end connected to the lower body and extends downward. Since the locking hook 26a has an elastic force with respect to the lower body 23 by the extension 26b, the end cover member 20 may be easily fitted by spreading the locking hook 26a when the end cover member 20 is fastened.

The locking hook 26a increases an amount in being locked, and the locking hook 26a has an upper surface formed to be tilted upward, such that when the end cover member 20 is fastened to the door panel 11, the end cover member 20 is prevented from being separated. Referring to portion D in FIG. 11, the locking hook 26a of the end cover member 20 is locked and the upper surface of the locking hook 26a is formed to be tilted upward, such that the end cover member 20 is prevented from being separated from the door panel 11.

Meanwhile, to accommodate the extension 26b and the locking hook 26a in the lower body 23, a fastening groove 23a may be formed by removing a part of the lower body 23.

The upper body 22 and the lower body 23 are positioned at the opposite sides around the door panel 11. In other words, when the upper body 22 is positioned on an outer surface side of the door panel 11, the lower body 23 is positioned on an inner surface side of the door panel 11.

The connection part 24 connects the upper body 22 to the lower body 23. The connection part 24 connects one side end of the upper body 22 to one side end of the lower body 23 to connect the upper body 22 to the lower body 23.

Further, the connection part 24 is connected to a bottom surface of the cover part 21. The connection part 24 is connected to the cover part 21 along the bottom surface of the cover part 21 from the upper end. The cover part 21, the upper body 22, the lower body 23, and the connection part 24 are integrally formed through the connection part 24.

At this time, the connection part 24 is connected to the cover part 21 in the form of dividing the bottom surface of the cover part 21 in a longitudinal direction of the vehicle. Therefore, the outbelt 13 and the glass run 12 are positioned on the left and right of line L-L in FIG. 8, respectively, and the end of the outbelt 13 and the end of the glass run 12 are positioned below the cover part 21, such that the cover part 21 covers the end of the outbelt 13 and the end of the glass run 12.

Further, the upper body 22 and the lower body 23 are formed on the same side around the connection part 24. For example, the upper body 22 and the lower body 23 are formed on the sides facing the front of the vehicle around the connection part 24, such that the end of the outbelt 13 fixes the upper body 22 and the lower body 23. A side on which the upper body 22 and the lower body 23 are not formed on the connection part 24 becomes a planar surface, and the end of the glass run 12 is positioned thereon.

Figure 13:
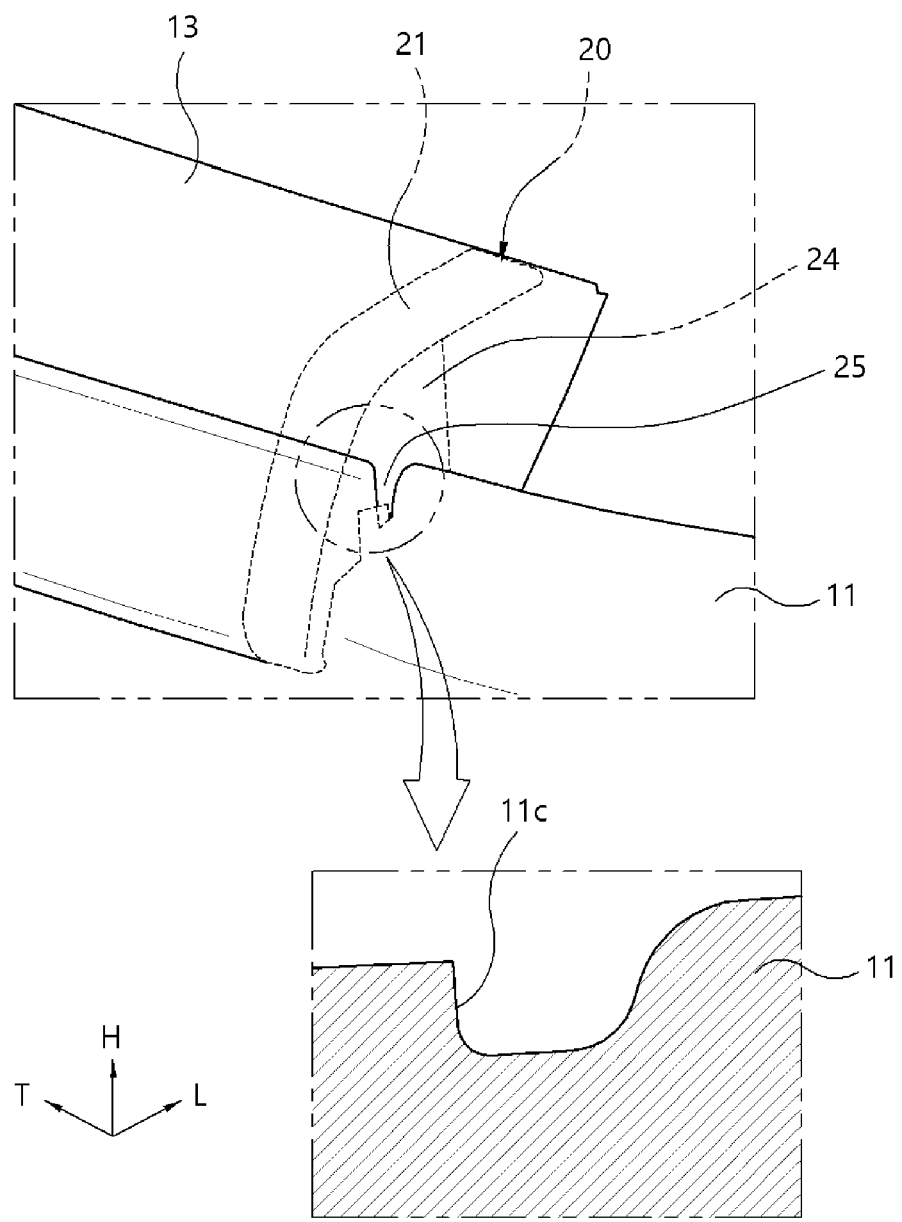
FIG. 13 is an enlarged diagram of portion C in FIG. 9.

One side of the connection part 24 is formed with a stopper 25 for limiting the movement of the end cover member 20 in a T direction, that is, a front and rear direction of the vehicle. The stopper 25 is locked to a stop surface 11c formed on the door panel 11 to which the end cover member 20 is fixed, and limits the movement of the end cover member 20 in the T direction. FIG. 13 illustrates an example in which the stop surface 11c is formed on a portion adjacent to the end of the glass run 12. The stop surface 11c is formed by applying an overlap to a notching portion formed by hemming the door panel 11. This reduces a cap when a temperature is changed, thereby limiting the movement of the end cover member 20 and the outbelt 13 in the T direction.

Meanwhile, the end cover member 20 is formed with fixing projections 27a, 27b for limiting the movement of the end cover member 20 in an L direction.

The fixing projections 27a, 27b are formed to extend from the lower body 23 or the connection part 24. The fixing projections 27a, 27b extend in a width direction of the vehicle by a certain distance from the lower body 23 and the connection part 24 and then extend in a longitudinal direction of the vehicle, such that a gap is formed between the fixing projections 27a, 27b and the lower body 23 or the connection part 24. A part of the outbelt 13 or the glass run 12 is fitted into the gap, which prevents the end cover member 20 from being separated in the L direction, that is, the width direction of the vehicle. The fixing projections 27a, 27b are preferably formed on the lower body 23 and the connection part 24, respectively. If the fixing projections 27a, 27b are formed on both the lower body 23 and the connection part 24, the fixing projection 27a formed on the lower body 23 and the fixing projection 27b formed on the connection part 24 are both formed in the same direction. For example, the fixing projections 27a, 27b are formed to be directed toward the front of the vehicle, such that the fixing projections 27a, 27b may be used to fix the end of the outbelt 13.

The fixing projections 27a, 27b are formed not to be locked when the end cover member 20 is coupled to the door panel 11.

The cover part 21, the upper body 22, the lower body 23, and the connection part 24 are each made of a mixed material of polypropylene (PP) and thermoplastic vulcanizate (TPV).

Meanwhile, a fastening structure of an outbelt and a glass run of a door using the end cover member for an outbelt of a door for a vehicle according to embodiments of the present disclosure will be described as follows.

When the outbelt 13 and the glass run 12 are fastened in the door for the vehicle, the aforementioned end cover member 20 is used.

The end cover member 20 covers the portion where the outbelt 13 and the glass run 12 abut each other.

Particularly, the end cover member 20 is preferably applied to a portion where a rear end of the outbelt 13 abuts the glass run 12 among a front end and the rear end of the outbelt 13. Therefore, the end cover member 20 may be fastened to the door panel 11 at a predetermined distance from a center pillar of the vehicle, thereby covering the end of the outbelt 13 and the end of the glass run 12 even without a separate fastening structure.

The end cover member 20 is fastened to a portion where the through hole 11a for fastening the end cover member 20 is formed in the door panel 11. When the end cover member 20 is fastened to the door panel 11, the movement of the end cover member 20 in the height direction (H direction) of the vehicle is limited by the seating surface 22a of the upper body 22 and the locking hook 26a.

The end of the outbelt 13 is fitted into one side of the end cover member 20 (front side of the vehicle from the connection part). The end of the outbelt 13 is placed on the upper body 22 of the end cover member 20, and fitted between the door panel 11 and the lower body 23 and fixed to the end cover member 20.

At this time, the fixing projections 27a, 27b cover the outer surface of the outbelt 13 to limit the movement of the end cover member 20 in the L direction, that is, the width direction of the vehicle with respect to the outbelt 13.

Meanwhile, the end cover member 20 is locked to the stop surface 11c positioned on the notching portion formed by hemming the door panel 11, such that the movement of the end cover member 20 in the longitudinal direction of the vehicle (T direction) is limited.

The end of the glass run 12 is positioned on the other side of the end cover member 20. The end of the outbelt 13 and the end of the glass run 12 are covered by the cover part 21 of the end cover member 20, which makes it possible to improve the quality of appearance.

Further, since the movement of the end cover member 20 is limited in all directions, the fastening force thereof increases and the end cover member 20, the end of the outbelt 13 and the end of the glass run 12 are prevented from being separated, which makes it possible to improve the quality of assembly.

What is claimed is:

1. An end cover member for an outbelt of a vehicle door, the end cover member comprising:
    a cover part configured to cover a portion where an end of the outbelt and an end of a glass run abut each other;
    an upper body positioned on an upper end of a panel mounted with a window glass;
    a lower body positioned below the upper body, the lower body including a locking hook locked and fixed to the panel, wherein the upper body and the locking hook vertically grip the panel to be fixed to the panel; and
    a connection part connecting the upper body to the lower body.

2. The end cover member of claim 1, further comprising an extension having an upper end connected to the lower body, wherein the locking hook extends from a lower end of the extension in a width direction of the vehicle door, such that an upper surface of the locking hook is locked to the panel.

3. The end cover member of claim 1, further comprising a locking part extending downward from a through hole of the panel, wherein the locking hook is locked to the locking part and is fixed to the panel.

4. The end cover member of claim 1, wherein the locking hook has an upper surface tilting upward.

5. The end cover member of claim 1, wherein the upper body comprises:
    a seating surface positioned on the upper end of the panel, the seating surface being configured to limit a downward movement of the end cover member; and
    a support surface abutting an outer surface of the panel;
    wherein the seating surface is formed in a width direction of the vehicle door; and
    wherein the support surface is formed in a height direction of the vehicle door.

6. The end cover member of claim 1, wherein the connection part comprises a stopper locked to a stop surface formed on the panel, the connection part being configured to limit a movement of the end cover member in a longitudinal direction of the vehicle door.

7. The end cover member of claim 1, further comprising a fixing projection protruding from the connection part, the fixing projection being configured to grip the outbelt.

8. The end cover member of claim 1, further comprising a fixing projection protruding from the lower body, the fixing projection being configured to grip the outbelt.

9. The end cover member of claim 1, wherein the upper body and the lower body are positioned at the opposite sides around the panel.

10. The end cover member of claim 1, wherein the cover part, the upper body, the lower body, and the connection part each comprise a mixed material of polypropylene (PP) and thermoplastic vulcanizate (TPV).

11. The end cover member of claim 10, wherein the cover part, the upper body, the lower body, and the connection part are integrally formed.

12. An end cover member for an outbelt of a vehicle door, the end cover member comprising:
    a cover part configured to cover a portion where an end of the outbelt and an end of a glass run abut each other;
    an upper body positioned on an upper end of a panel mounted with a window glass;
    a lower body positioned below the upper body, the lower body including a locking hook locked and fixed to the panel, wherein the upper body and the locking hook vertically grip the panel to be fixed to the panel;
    a connection part connecting the upper body to the lower body; and
    a first fixing projection protruding from the connection part and a second fixing projection protruding from the lower body, the first and the second fixing projections each being configured to grip the outbelt.

13. The end cover member of claim 12, wherein:
the first and the second fixing projections are formed in a longitudinal direction of the vehicle door at an interval from the connection part or the lower body, respectively; and
the outbelt is inserted between the connection part and the first fixing projection and between the lower body and the second fixing projection to limit a movement of the end cover member in a width direction of the vehicle door.

14. The end cover member of claim 12, wherein the first fixing projection and the second fixing projection are formed in a same direction.

15. The end cover member of claim 14, wherein the first fixing projection and the second fixing projection are formed to be directed toward a front of a vehicle.

16. The end cover member of claim 12, wherein the upper body and the lower body are positioned at the opposite sides around the panel.

17. The end cover member of claim 12, wherein the cover part, the upper body, the lower body, and the connection part each comprise a mixed material of polypropylene (PP) and thermoplastic vulcanizate (TPV), and wherein the cover part, the upper body, the lower body, and the connection part are integrally formed.

18. A vehicle comprising:
a vehicle body;
a door panel coupled to the vehicle body and installed with a window glass, the door panel including:
  a glass run, the glass run being configured to support a circumference of the window glass; and
  an outbelt provided in a longitudinal direction of the vehicle, the outbelt being configured to guide an upward or downward movement of the window glass; and
an end cover member fitted into and fixed to the door panel, the end cover member covering and fixing an end of the outbelt and an end of the glass run, wherein the end cover member comprises:
  a cover part covering a portion where the end of the outbelt and the end of the glass run abut each other;
  an upper body positioned on an upper end of the door panel;
  a lower body positioned below the upper body, the lower body including a locking hook locked and fixed to the door panel, wherein the upper body and the locking hook vertically grip the door panel to be fixed to the door panel; and
  a connection part connecting the upper body to the lower body.

19. The vehicle of claim 18, wherein:
the end of the outbelt covers the upper body of the end cover member on a first side of the connection part of the end cover member and is fitted and fixed between the lower body of the end cover member and the door panel;
the end of the glass run is positioned on a second side of the connection part; and
the cover part of the end cover member covers the end of the outbelt and the end of the glass run.

* * * * *